(12) United States Patent
Retig et al.

(10) Patent No.: US 9,896,208 B2
(45) Date of Patent: Feb. 20, 2018

(54) DRONE DEPLOYMENT SYSTEM

(71) Applicants: Alan Retig, Munford, TN (US); David J Kreher, Memphis, TN (US)

(72) Inventors: Alan Retig, Munford, TN (US); David J Kreher, Memphis, TN (US)

(*) Notice: Subject to any disclaimer, the term of this patent is extended or adjusted under 35 U.S.C. 154(b) by 260 days.

(21) Appl. No.: 14/951,527

(22) Filed: Nov. 25, 2015

(65) Prior Publication Data

US 2017/0144762 A1   May 25, 2017

(51) Int. Cl.
*B64D 5/00*   (2006.01)

(52) U.S. Cl.
CPC ...................... *B64D 5/00* (2013.01)

(58) Field of Classification Search
CPC .... B64D 5/00; B64D 1/00; B64D 1/02; B64C 2201/128; B64C 2201/082; B64C 39/02
See application file for complete search history.

(56) References Cited

U.S. PATENT DOCUMENTS

| | | | | |
|---|---|---|---|---|
| 2,471,599 | A * | 5/1949 | Young | B64D 5/00 244/2 |
| 3,485,466 | A * | 12/1969 | Prewitt | B64D 1/02 244/137.1 |
| 3,703,998 | A | 11/1972 | Girard | |
| 3,891,165 | A | 6/1975 | Day et al. | |
| 4,890,751 | A * | 1/1990 | Opdahl | B64D 3/02 212/271 |
| 5,109,788 | A | 5/1992 | Heinzmann | |
| 7,188,807 | B2 * | 3/2007 | Smith | B64D 39/06 141/231 |
| 7,798,445 | B2 | 9/2010 | Heppe et al. | |
| 7,900,866 | B2 | 3/2011 | Kutzmann et al. | |
| 8,167,242 | B2 | 5/2012 | McDonnell | |
| 8,231,083 | B2 | 7/2012 | Kutzmann et al. | |
| 8,517,306 | B2 | 8/2013 | McDonnell et al. | |
| 8,567,718 | B1 | 10/2013 | McDonnell et al. | |
| 8,864,069 | B2 | 10/2014 | McDonnell et al. | |
| 8,950,698 | B1 * | 2/2015 | Rossi | B64C 37/02 244/2 |
| 2006/0202088 | A1 * | 9/2006 | Padan | B64D 1/00 244/137.1 |
| 2008/0191091 | A1 | 8/2008 | Hoisington et al. | |
| 2016/0355261 | A1 * | 12/2016 | Chin | B64D 5/00 |
| 2017/0038780 | A1 * | 2/2017 | Fandetti | G05D 1/104 |
| 2017/0197725 | A1 * | 7/2017 | Foo | B64D 39/02 |

* cited by examiner

*Primary Examiner* — Christopher P Ellis
*Assistant Examiner* — Magdalena Topolski
(74) *Attorney, Agent, or Firm* — David J. Kreher

(57) ABSTRACT

The present disclosure reveals a drone deployment system for use from an airborne aircraft such that the drone deployment system is capable of moving through the aircraft, picking up a drone with a grappling means attached to an extendable arm, moving to an opening in the aircraft, extending and deploying the drone. The drone deployment system is further capable of retrieving a drone by having the extendable arm extended out the opening in the aircraft, having the drone fly into the grappling means which then engages, holding the drone, and the extendable arm is then retractable so that the opening can be closed and the drone placed in storage.

18 Claims, 6 Drawing Sheets

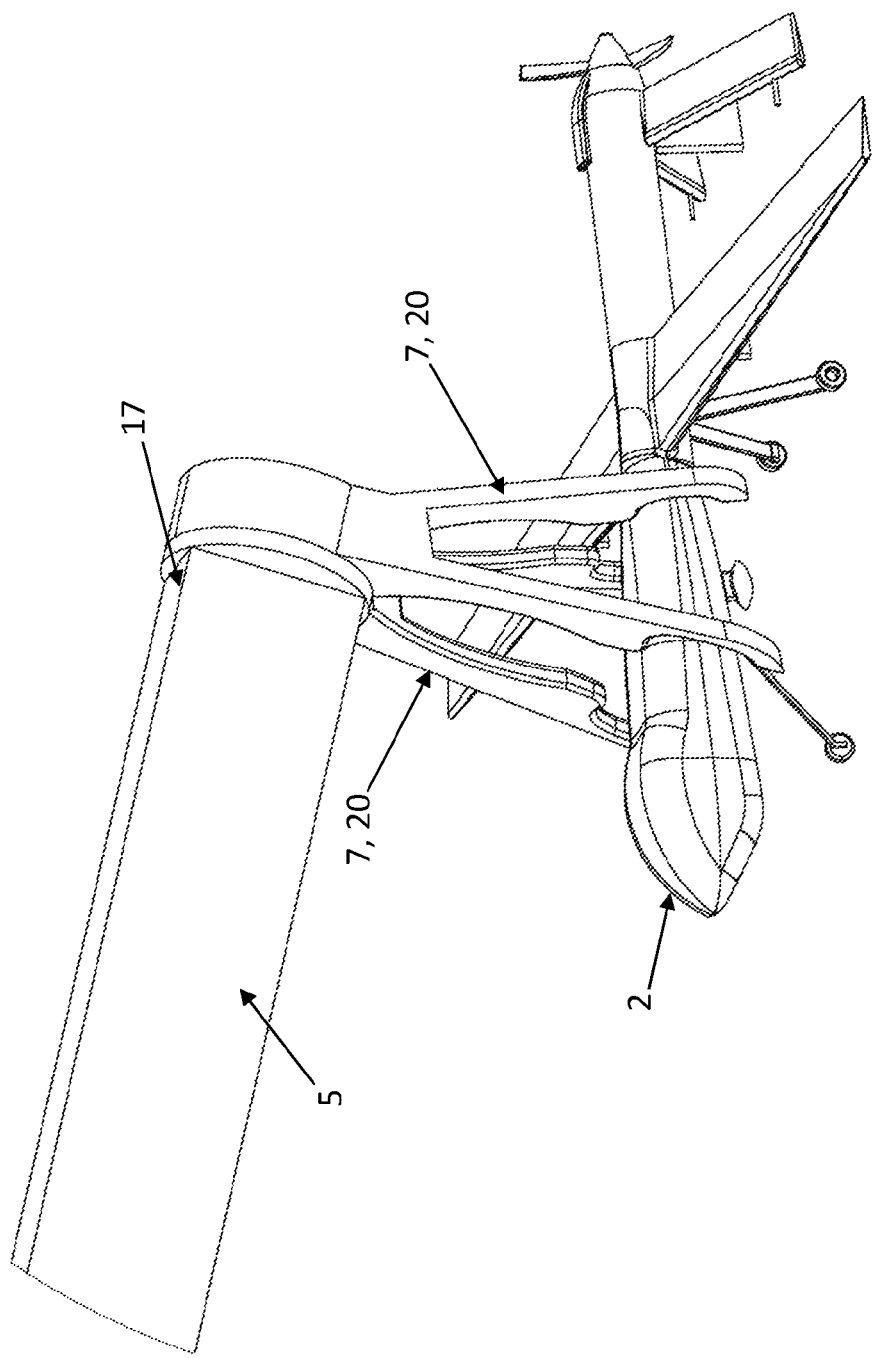

DRONE DEPLOYMENT SYSTEM

CROSS-REFERENCE TO RELATED APPLICATIONS

Not applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

This invention related to the ability of deploying and releasing a drone from an airborne aircraft by means of a drone deployment system comprising a mobile cart with extendable arm and grappling means, where the drone deployment system is capable of picking up a drone, moving to an opening, and extending the extendable arm out the opening of the aircraft so that the grappling means can be disengaged and the drone deployed. The drone deployment system is also able to retrieve a drone when the extendable arm is extended out the opening of the aircraft when the drone flies to the grappling means, at which time the grappling means is activated to attach the drone to the grappling means. The extendable arm can then retract to bring the drone into the aircraft.

Background of the Invention

Although the use of drones for remote sensing and other activities is becoming commonplace, to date, there is no ability to deploy a drone from the compartment of a flying aircraft and retrieve a drone, and then draw the drone into the aircraft. The present disclosure would allow flying aircraft the ability to deploy and retrieve drones, thus enhancing the ability to use drones in any desired area.

SUMMARY OF THE INVENTION

The present disclosure reveals a drone deployment system capable of deploying and retrieving a drone from within an airborne aircraft wherein the drone deployment system comprises a cart with an extendable arm, wherein the cart with a plurality of wheeled means where the wheeled means involves wheels or tracts, that is capable of moving through the aircraft, picking up a drone with a grappling means attached to an extendable arm, moving to an opening in the aircraft, extending the extendable arm and releasing the drone from the grappling means, thus deploying the drone. The drone deployment system is further capable of retrieving a drone by having the extendable arm extended out the opening in the aircraft, having the drone fly to the grappling means, wherein the grappling means then engages to capture the drone, and the extendable arm can then be retracted so that the opening can be closed and the drone placed in storage.

In one embodiment of the cart, the plurality of wheeled means allow the cart to move through the aircraft. In a second embodiment of the cart, the plurality of wheeled means is designed to operate on a track within the aircraft, allowing further stability of the cart in the aircraft.

The grappling means may comprise a plurality of clamps, a plurality of electromagnetic plates, or a combination of a plurality of clamps and a plurality of electromagnetic plates.

BRIEF DESCRIPTION OF THE SEVERAL VIEWS OF THE DRAWING

FIG. 4A is a view of the grappling means including the plurality of clamps to connect the extendable arm to the drone;

DETAILED DESCRIPTION OF THE INVENTION

Figure 1:
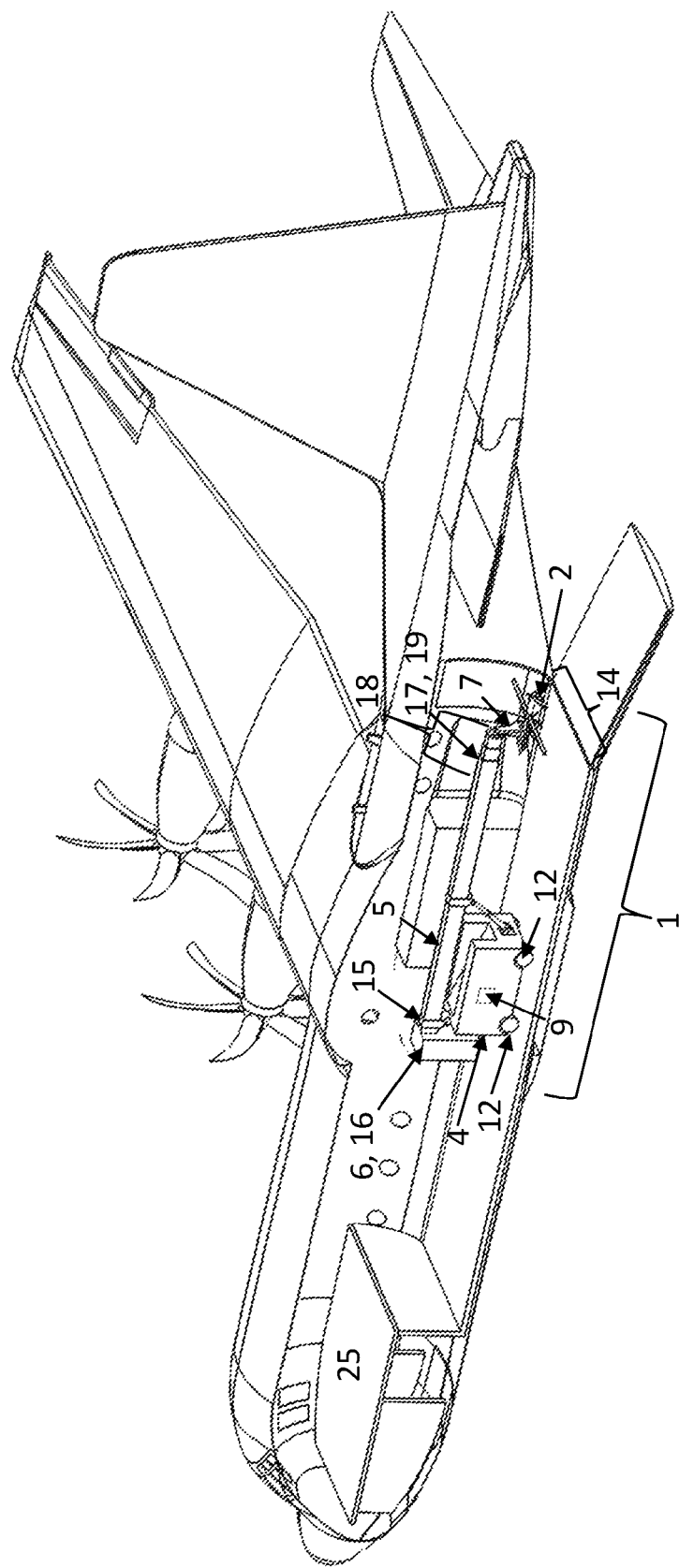
FIG. 1 is a view of the drone deployment system within an aircraft.
Figure 2:
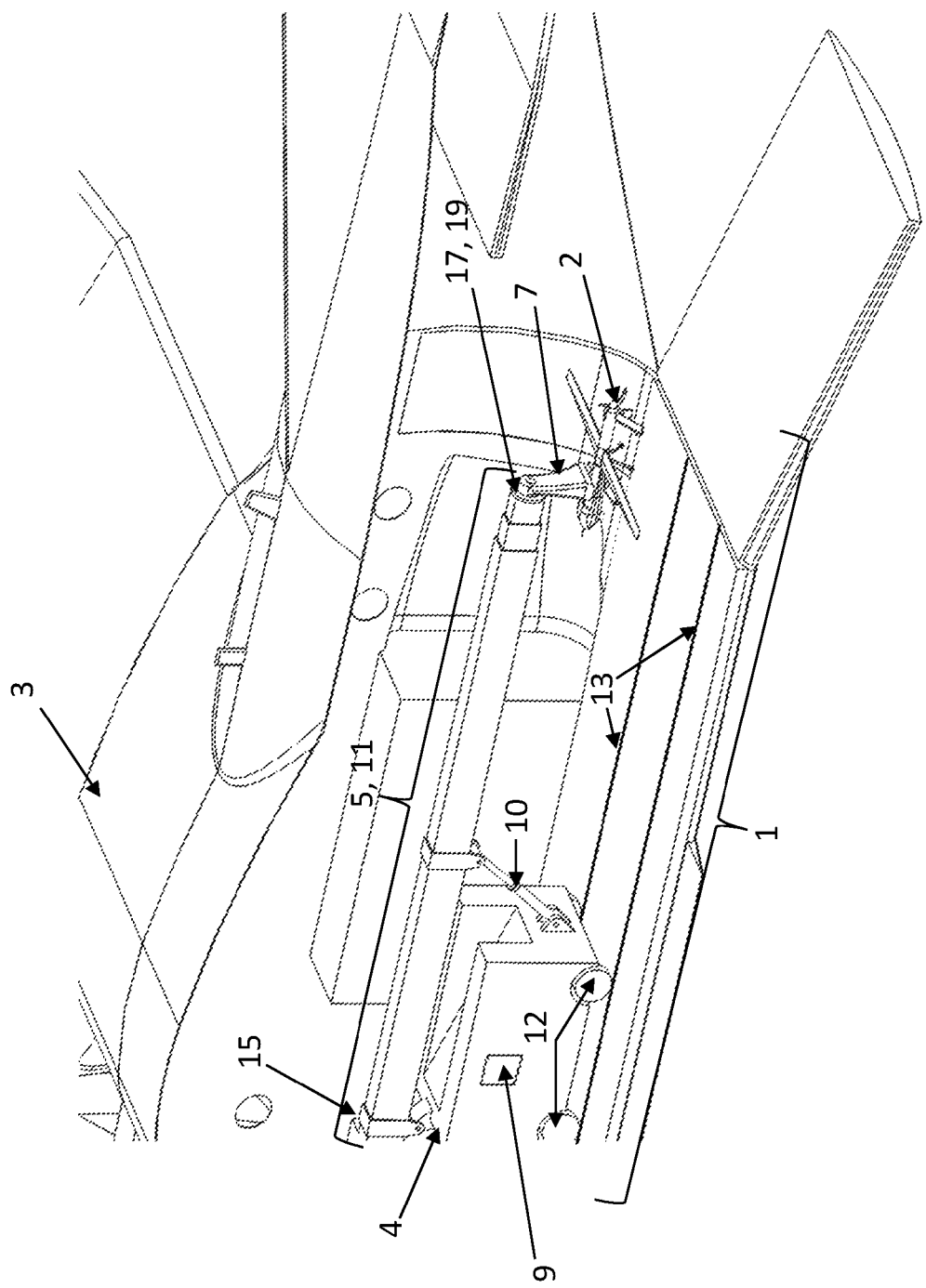
FIG. 2 is a close-up view of the drone deployment system.
Figure 3:
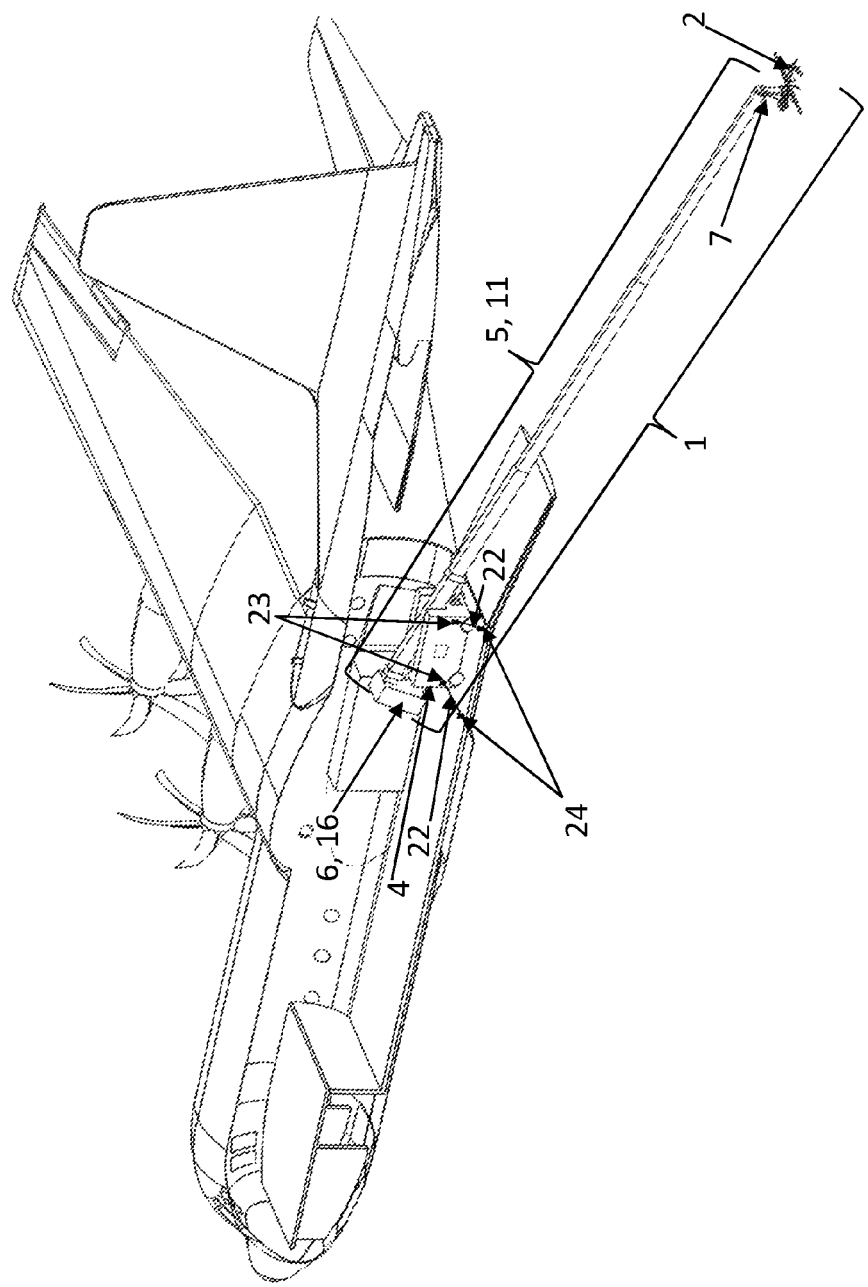
FIG. 3 is a view of the drone deployment system with the extendable arm outside the aircraft in the process of deploying a drone.
Figure 4B:
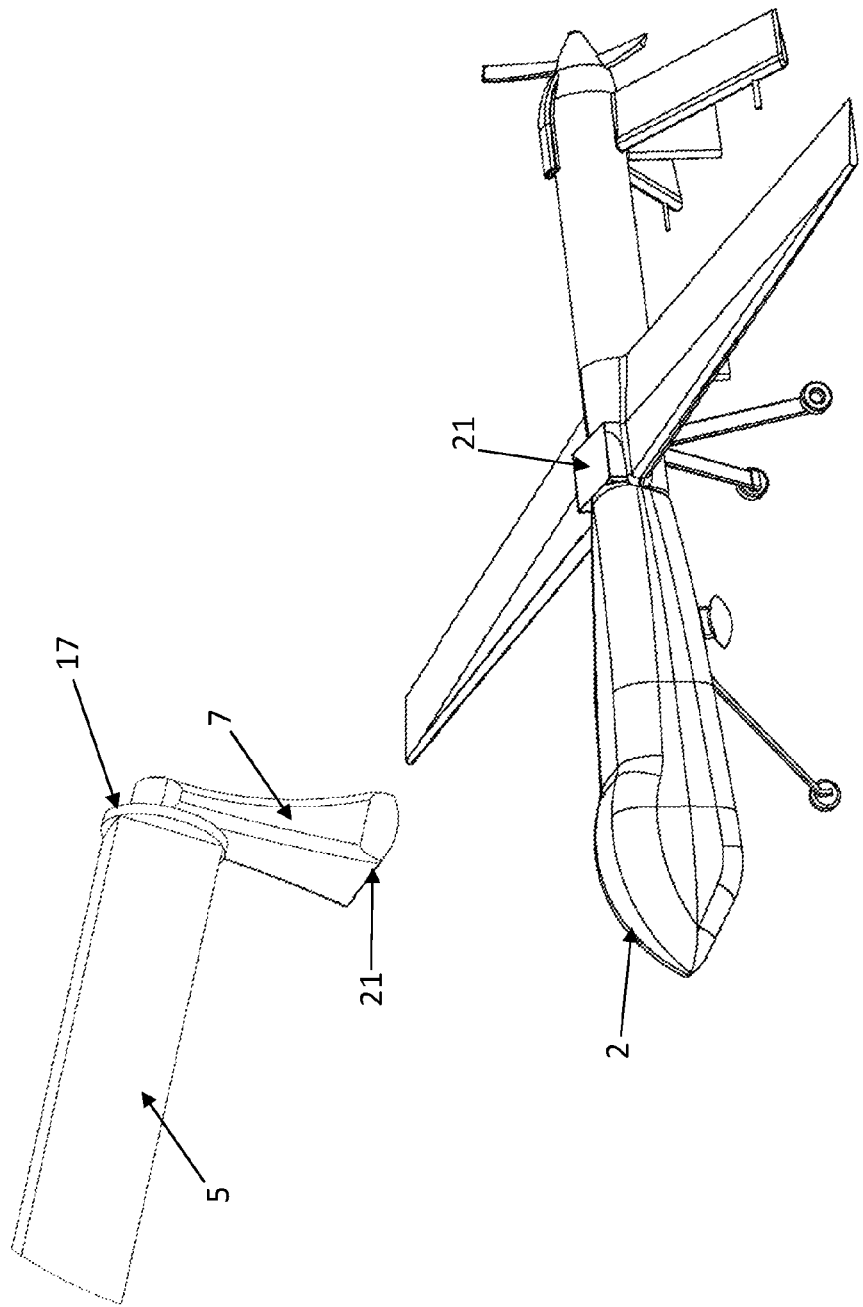
FIG. 4B is a view of the grappling means including the plurality of electromagnetic plates to connect the extendable arm to the drone.
Figure 4C:
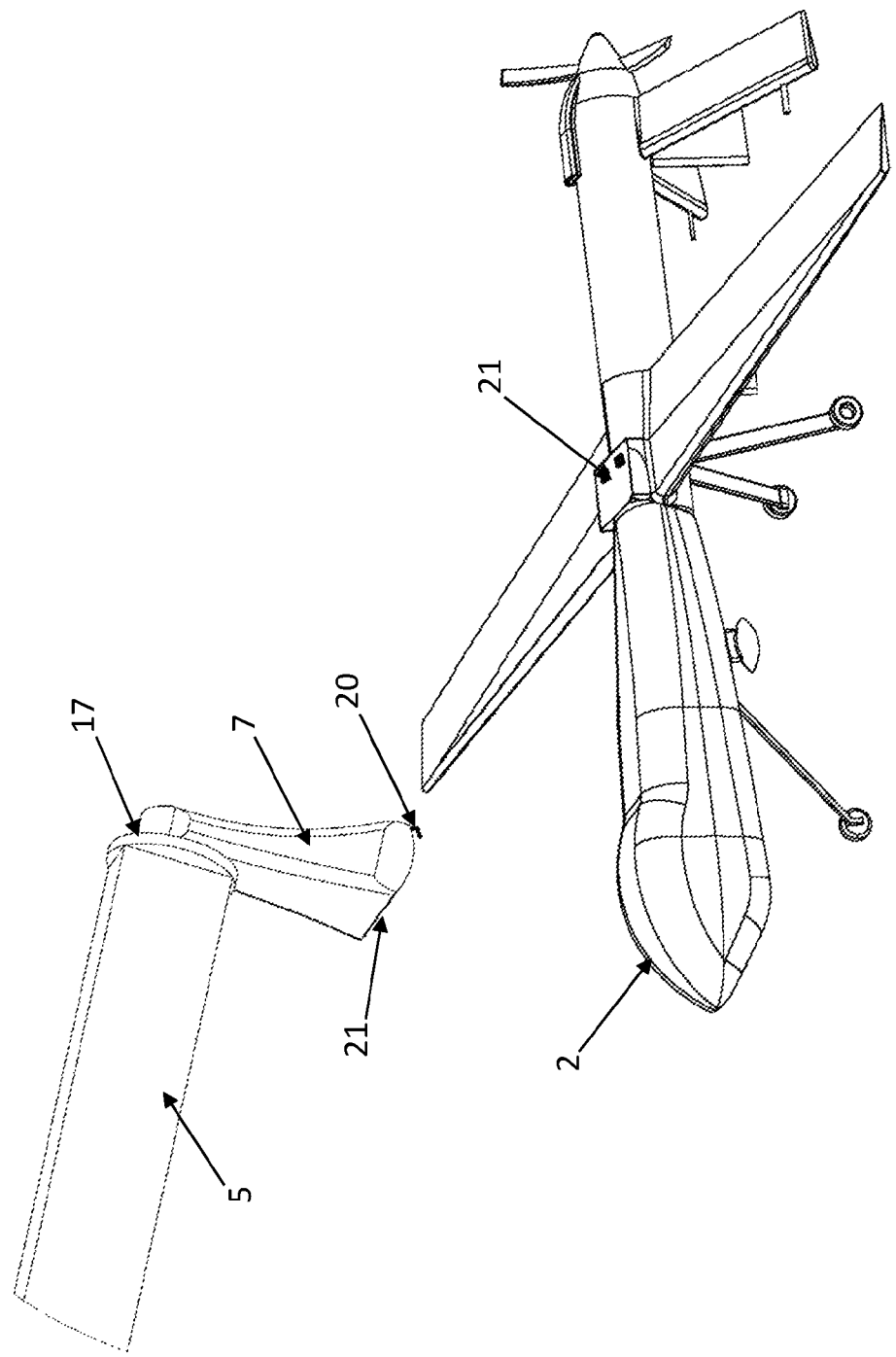
FIG. 4C is a view of the grappling means including the plurality of clamps and plurality of electromagnetic plates to connect the extendable arm to the drone.

A drone deployment system 1 for deploying and retrieving a drone 2 from within the body 25 of an aircraft 3 while the aircraft 3 is in flight comprising a cart 4, an extendable arm 5, a counter weight 6, a grappling means 7, and may include an anchoring means 8.

The cart 4 is a motorized, movable platform with a plurality of wheeled means 12 wherein the plurality of wheeled means 12 could include wheels or tracts, that is positioned within the aircraft 3 and comprises a plurality of controls 9 to drive the cart 4, position the extendable arm 5, and operate the grappling means 7, and also comprises a hydraulic system 10 to facilitate the adjustment and length 11 of the extendable arm 5. The wheeled means 12 of the cart 4 allow the cart 4 to move through the aircraft 3. These wheeled means 12 can facilitate the free movement of the cart 4 or can be designed to facilitate the cart's movement along a track 13 within the aircraft 3.

The extendable arm 5 is attached to the cart 4 such that the extendable arm 5 is hydraulically adjustable up, down, and laterally so as to facilitate the pick-up, deployment, retrieval, and placement of a drone 2. The extendable arm 5 is also extendable such that when the cart 4 is appropriately positioned, the extendable arm 5 can be extended outside of the aircraft 3 through an opening 14 in the aircraft 3. At one end 15 of the extendable arm 5 is a counter-weight 16 of such size to facilitate the lifting, deployment and retrieval of a drone 2 when said extendable arm 5 is extended outside the aircraft 3. The opposite end 17 of the extendable arm 5 from the counter-weight 16 is a plurality of hydraulically adjustable telescoping portions 18 that interact to allow the extendable arm 5 to be extended and retracted. The end 19 of the extendable arm that consists of the plurality of telescoping portions 18 comprises a grappling means 7 for picking up, deploying and retrieving a drone 2. The grappling means 7 comprises a plurality of clamps 20 or a plurality of electromagnetic plates 21 to facilitate the attachment of the drone 2 to the drone deployment system 1 or the release of the drone 3 from the drone deployment system 1.

The anchoring means 8 may be attached to the cart 4 and comprise a plurality of adjustable straps or cables 22 with an attachment means 23 at the end of each of the plurality of adjustable straps or cables 22, so as to anchor the cart 4 into a stationary position within the aircraft 3 through the connection of each of the plurality of attachment means 23 to one of the plurality of attachment points 24 within the aircraft 3 and then adjusting each of the plurality of adjustable straps or cables 22.

When the drone deployment system 1 is in operation, the cart 4 is capable of being moved through the aircraft 3 and the extendable arm 5 deployed to allow the grappling means 7 to be positioned such that the grappling means 7 can pick up a drone 2. The cart 4 can then be maneuvered through the aircraft 3 positioned near the opening 14 of the aircraft 3 and anchored down with the use of the anchoring means 8. The extendable arm 5, now holding the drone 2, can then be extended out the opening 14 and the grappling means 7 is engaged, which would cause the drone 2 to be released from the grappling means 7 for deployment. The extendable arm 5 can then be retracted and the opening 14 of the aircraft 3 closed. When the drone 2 is to be retrieved, the extendable arm 5 and grappling means can be extended out the opening 14 of the aircraft 3. The drone 2 can then fly to the grappling means 7, which activates, causing the drone 2 to be attached to the grappling means 7. The extendable arm 5 can then retracted, which draws the drone 2 into the aircraft 3. The anchoring means 8 can then be released to allow the cart 4 to be moved through the aircraft 3. Once the cart 4 is positioned, the extendable arm 5 can be adjusted to position the drone 2 in a storage place, at which time the grappling means 7 can be disengaged and the drone 2 released.

What is claimed:

1. A drone deployment system for deploying and retrieving a drone from the body of an aircraft while the aircraft is in flight comprising:
    a cart, an extendable arm, a counter weight, and a grappling means;
    the cart is a motorized, movable platform with a plurality of wheeled means that is positioned within the aircraft which comprises a plurality of controls to drive the cart, position the extendable arm, and operate the grappling means, as well as a hydraulic system to facilitate the adjustment and extension of the extendable arm;
    the extendable arm is attached to the cart such that the arm is hydraulically adjustable up, down, and laterally so as to facilitate the pick-up, deployment, retrieval, and placement of the drone;
    the extendable arm is also extendable such that it can be extended outside of the aircraft through an opening in the aircraft such that the drone may be released and retrieved therefrom;
    at one end of the extendable arm is the counter weight of such size to facilitate the lifting, deployment and retrieval of the drone when said extendable arm is extended outside the aircraft;
    at an opposite end of the extendable arm from the counter weight are a plurality of hydraulically adjustable telescoping portions that allow the extendable arm to be extended and retracted; and
    the opposite end of the extendable arm comprises the grappling means for picking up, deploying and retrieving the drone.

2. The drone deployment system of claim 1 wherein the wheeled means of the cart allow the cart to move through the aircraft.

3. The drone deployment system of claim 2 wherein the grappling means comprises a plurality of clamps to facilitate the attachment of the drone to the drone deployment system or the release of the drone from the drone deployment system.

4. The drone deployment system of claim 2 wherein the grappling means comprises a plurality of electromagnetic plates to facilitate the attachment of the drone to the drone deployment system or the release of the drone from the drone deployment system.

5. The drone deployment system of claim 2 wherein the grappling means comprises a plurality of clamps and a plurality of electromagnetic plates to facilitate the attachment of the drone to the drone deployment system or the release of the drone from the drone deployment system.

6. The drone deployment system of claim 1 wherein the wheeled means of the cart are designed to operate on a track within the aircraft.

7. The drone deployment system of claim 6 wherein the grappling means comprises a plurality of clamps to facilitate the attachment of the drone to the drone deployment system or the release of the drone from the drone deployment system.

8. The drone deployment system of claim 6 wherein the grappling means comprises a plurality of electromagnetic plates to facilitate the attachment of the drone to the drone deployment system or the release of the drone from the drone deployment system.

9. The drone deployment system of claim 6 wherein the grappling means comprises a plurality of clamps and a plurality of electromagnetic plates to facilitate the attachment of the drone to the drone deployment system or the release of the drone from the drone deployment system.

10. A drone deployment system for deploying and retrieving a drone from the body of an aircraft while the aircraft is in flight comprising:
    a cart, an extendable arm, a counter weight, a grappling means, and an anchoring means;
    the cart is a motorized, movable platform with a plurality of wheeled means that is positioned within the aircraft which comprises a plurality of controls to drive the cart, position the extendable arm, and operate the grappling means, as well as a hydraulic system to facilitate the adjustment and extension of the extendable arm;
    the extendable arm is attached to the cart such that the arm is hydraulically adjustable up, down, and laterally so as to facilitate the pick-up, deployment, retrieval, and placement of the drone;
    the extendable arm is also extendable such that it can be extended outside of the aircraft through an opening in the aircraft such that the drone may be released and retrieved therefrom;
    at one end of the extendable arm is the counter weight of such size to facilitate the lifting, deployment and retrieval of the drone when said extendable arm is extended outside the aircraft;
    at an opposite end of the extendable arm from the counter weight are a plurality of hydraulically adjustable telescoping portions that allow the extendable arm to be extended and retracted;
    the opposite end extendable arm comprises the grappling means for picking up, deploying and retrieving the drone; and
    the anchoring means are attached to the cart and comprises a plurality of adjustable straps or cables with an attachment means at the end of each adjustable strap or cable that can be attached to attachment points within the aircraft, so as to anchor the cart into a stationary position within the aircraft so that the drone can be lifted, deployed, retrieved, or placed.

11. The drone deployment system of claim 10 wherein the wheeled means of the cart allow the cart to move through the aircraft.

12. The drone deployment system of claim 11 wherein the grappling means comprises a plurality of clamps to facilitate the attachment of the drone to the drone deployment system or the release of the drone from the drone deployment system.

13. The drone deployment system of claim 11 wherein the grappling means comprises a plurality of electromagnetic plates to facilitate the attachment of the drone to the drone deployment system or the release of the drone from the drone deployment system.

14. The drone deployment system of claim 11 wherein the grappling means comprises a plurality of clamps and a plurality of electromagnetic plates to facilitate the attachment of the drone to the drone deployment system or the release of the drone from the drone deployment system.

15. The drone deployment system of claim 10 wherein the wheeled means of the cart are designed to operate on a track within the aircraft.

16. The drone deployment system of claim 15 wherein the grappling means comprises a plurality of clamps to facilitate the attachment of the drone to the drone deployment system or the release of the drone from the drone deployment system.

17. The drone deployment system of claim 15 wherein the grappling means comprises a plurality of electromagnetic plates to facilitate the attachment of the drone to the drone deployment system or the release of the drone from the drone deployment system.

18. The drone deployment system of claim 15 wherein the grappling means comprises a plurality of clamps and a plurality of electromagnetic plates to facilitate the attachment of the drone to the drone deployment system or the release of the drone from the drone deployment system.

* * * * *